US010286892B1

(12) United States Patent
Johri et al.

(10) Patent No.: US 10,286,892 B1
(45) Date of Patent: May 14, 2019

(54) AUTONOMOUS MOTOR CONTROL DURING LOSS OF MOTOR COMMUNICATIONS

(71) Applicant: Ford Global Technologies, LLC, Dearborn, MI (US)

(72) Inventors: Rajit Johri, Canton, MI (US); Fazal Urrahman Syed, Canton, MI (US); Paul Stephen Bryan, Saline, MI (US); Brian Francis Morton, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/896,412

(22) Filed: Feb. 14, 2018

(51) Int. Cl.
| | |
|---|---|
| H02P 1/46 | (2006.01) |
| H02P 1/50 | (2006.01) |
| H02P 3/18 | (2006.01) |
| H02P 6/00 | (2016.01) |
| B60W 10/08 | (2006.01) |
| B60L 15/20 | (2006.01) |
| H02P 6/06 | (2006.01) |
| H02P 23/14 | (2006.01) |
| B60K 6/26 | (2007.10) |
| B60W 10/24 | (2006.01) |
| B60L 3/00 | (2019.01) |
| H02P 3/06 | (2006.01) |

(52) U.S. Cl.
CPC ............... B60W 10/08 (2013.01); B60K 6/26 (2013.01); B60L 3/0061 (2013.01); B60L 15/20 (2013.01); B60W 10/24 (2013.01); H02P 3/06 (2013.01); H02P 6/06 (2013.01); H02P 23/14 (2013.01); *B60L 2240/42* (2013.01)

(58) Field of Classification Search
CPC ................................. B60W 10/08; B60K 6/26
USPC ........................................................ 318/715
See application file for complete search history.

(56) References Cited

U.S. PATENT DOCUMENTS

| | | | |
|---|---|---|---|
| 4,777,420 A | 10/1988 | Dadpey et al. |
| 7,049,779 B2 | 5/2006 | Chen et al. |
| 8,002,665 B2 | 8/2011 | Heap et al. |
| 9,654,032 B2 | 5/2017 | Barrass et al. |
| 9,735,720 B2 | 8/2017 | Luedtke et al. |

FOREIGN PATENT DOCUMENTS

DE  102013212310 A1  12/2014

*Primary Examiner* — Erick D Glass
(74) *Attorney, Agent, or Firm* — David Kelley; Brooks Kushman P.C.

(57) ABSTRACT

A computer-implemented method includes, responsive to absence of a motor controller receiving communication packets for a predetermined time during a drive cycle, operating by the controller (i) an inverter to output voltage at a setpoint defined by an inverter terminal voltage at expiration of the predetermined time, and (ii) a motor coupled with the inverter to apply torque according to a change in the voltage.

16 Claims, 3 Drawing Sheets

AUTONOMOUS MOTOR CONTROL DURING LOSS OF MOTOR COMMUNICATIONS

TECHNICAL FIELD

This application is generally related to an electric motor system configured to operate during a loss of communication event between the electric motor system and a vehicle network.

BACKGROUND

Hybrid electric vehicles (HEVs) include an internal combustion engine, an electric machine such as an electric motor, and a traction battery. In these vehicles, signals are sent and received over at least one vehicle network. The electric motor system receives critical information over the vehicle network, including the motor torque necessary to meet vehicle performance requirements and driver demand. In the event of a loss of communication between the electric motor system and the vehicle network, several actions may be necessary to ensure continued operation of the vehicle. Since shutdown of the entire vehicle may be undesirable, limited operation strategy (LOS) modes can be implemented to prolong vehicle operation.

SUMMARY

A vehicle includes a motor, an inverter, and a motor controller. The motor controller may be configured to, responsive to an absence of receiving communication packets for a predetermined time during a drive cycle, operate the inverter to output voltage at a setpoint defined by a terminal voltage of the inverter at expiration of the predetermined time, the motor configured to apply torque according to a change in the voltage.

A hybrid vehicle includes a motor, an engine, a traction battery, and an engine controller. The engine controller may be configured to, responsive to an absence of receiving communication packets from a motor controller for a predetermined time during a drive cycle, operate the engine according to a current of the traction battery.

A computer-implemented method includes, responsive to absence of a motor controller receiving communication packets for a predetermined time during a drive cycle, operating by the controller (i) an inverter to output voltage at a setpoint defined by an inverter terminal voltage at expiration of the predetermined time, and (ii) a motor coupled with the inverter to apply torque according to a change in the voltage.

DETAILED DESCRIPTION

Figure 1:
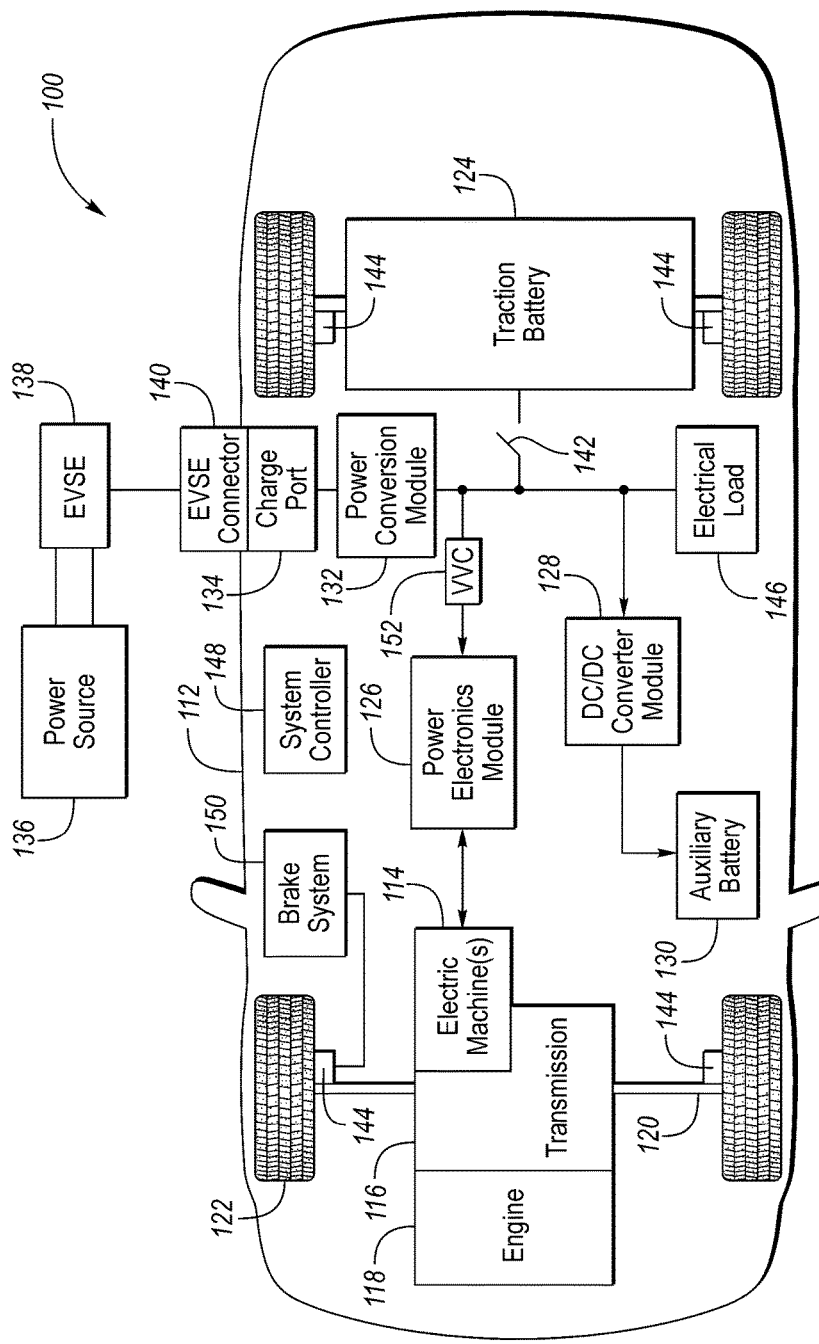
FIG. 1 is a block diagram of a hybrid vehicle illustrating typical drivetrain and energy storage components including a variable voltage variable frequency converter.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Often vehicles include multiple modules (e.g., controllers) each performing specific tasks and often each module requires data from a different module to perform effectively. In some instances, a loss of communication between two modules may result in a shutdown of the vehicle after which the vehicle is inoperable until the loss of communication is restored. Often, the communication includes the transfer of data packets, the packets may include a source ID, a destination ID, a header, a body (e.g., data), an error checking field (e.g., checksum), etc. For example, after a loss of communication with a motor control unit (MCU), the electric motor may not be able to be used to charge a traction battery/high-voltage battery that in turn would restrict charging of a 12V low-voltage battery. As such, the traction battery may eventually become depleted due to use of high-voltage loads (e.g., air-conditioning load, DC/DC), followed by the 12V battery, resulting in a power down of the 12V bus. Once the 12V bus powers down, modules on the bus (e.g., Engine Control Unit (ECU)) may also power down and the Internal Combustion Engine controlled by the ECU would be shut down resulting in a shutdown of the vehicle (e.g., quit on road (QoR)).

Here, a strategy is provided to continue to operate a vehicle when a controller (such as an MCU) loses communication (e.g., CAN, Ethernet, or Flexray communication). In one illustration, an MCU loses communication with all modules including a Battery Control Module (BECM). Loss of BECM communication is a more restrictive failure and hence, is a superset of other possible scenarios for example, an MCU partial CAN communication loss.

Here, the MCU operates the motor independently (i.e., without a torque command received from a vehicle system controller (VSC)). In a lost communication scenario, the MCU enters into an inverter voltage maintenance mode (i.e., a desired motor torque is based on a feedback controller to maintain an inverter voltage at a desired set point. The VSC uses traction battery current and traction battery voltage to estimate a motor torque in an absence of actual feedback from MCU monitoring the motor. The VSC then corrects the requested engine torque based on the estimated motor torque. This ensures engine produces enough torque to meet driver demand as well as to compensate for the electric motor load.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 2 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V^*_{dc}$. The VVC controller may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 1, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor may be electrically coupled in parallel to the traction battery 124. The input capacitor may reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 2:
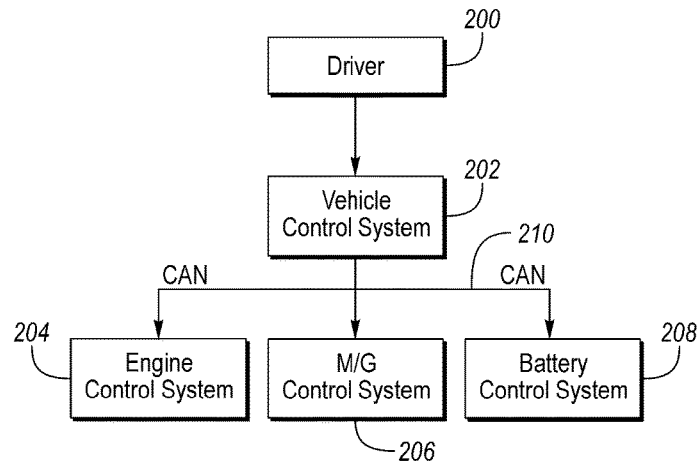
FIG. 2 is a block diagram of a vehicular powertrain control system.
Figure 3:
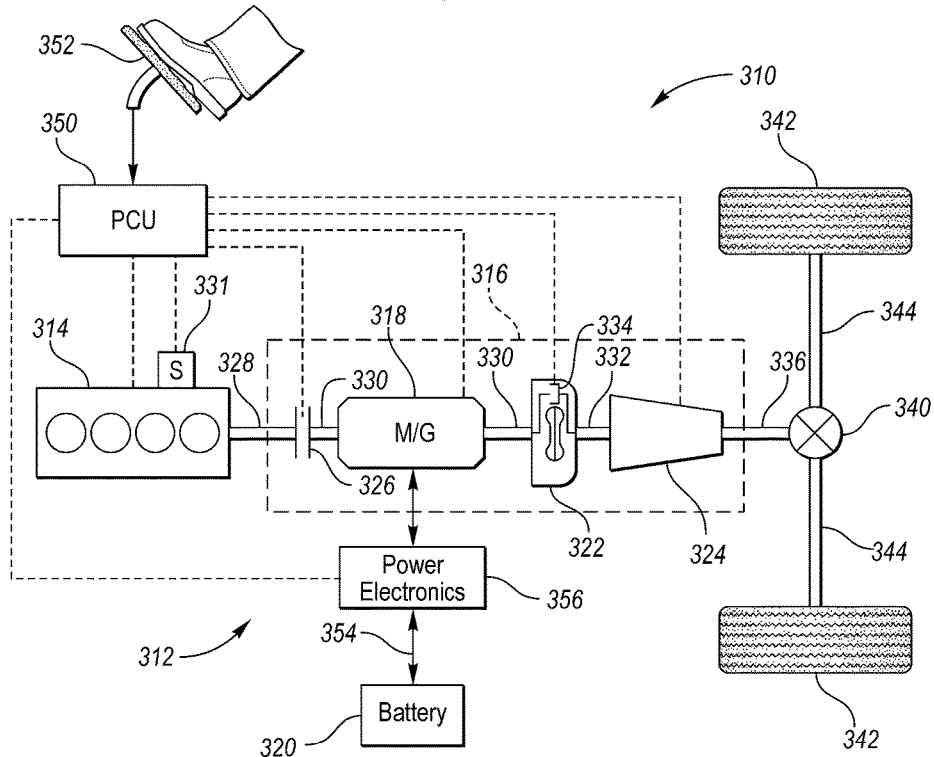
FIG. 3 is a schematic diagram of a hybrid electric vehicle (HEV).

FIG. 2 is a block diagram illustrating an example vehicle control system for a vehicle (e.g., vehicle 112 or vehicle 310 of FIG. 3). As shown, vehicle control system 202 receives signals and/or commands generated by driver inputs 200 (e.g., gear selection, accelerator position, and braking effort). The vehicle control system 202 processes these driver inputs 200 and communicates commands throughout the vehicle. The vehicle control system 202 may be electrically connected to various other powertrain control systems 204-208, such as the engine control system 204, M/G control system 206, and battery control system 208, for example, and may act as an overall controller of the vehicle. The vehicle control system 202 may be electrically connected to and communicate with various powertrain control systems 204-208 over a vehicle network 210. The vehicle network 210 continuously broadcasts data and information to the powertrain control systems 204-208. The vehicle network 210 may be a controlled area network (CAN) bus, Flexray bus, Ethernet bus, or other vehicle communication bus used to pass data to and from the vehicle control system 202 and other various controllers, subsystems or components thereof.

In hybrid vehicles, the motor system receives critical information over the vehicle network. Signals such as a desired torque, mode of operation, and other critical signals are sent and received on this network. In the event of a loss of communication between the motor system and vehicle network, several actions may be necessary to ensure continued operation of the vehicle. Since shutdown of the entire vehicle may be undesirable, limited operation strategy (LOS) modes can be implemented to prolong the operation of the vehicle.

Referring to FIG. 3, a schematic diagram of a hybrid electric vehicle (HEV) 310 is illustrated according to an embodiment of the present disclosure. FIG. 3 illustrates representative relationships among the components. Physical placement and orientation of the components within the vehicle may vary. The HEV 310 includes a powertrain 312. The powertrain 312 includes an engine 314 that drives a transmission 316, which may be referred to as a modular hybrid transmission (MHT). As will be described in further detail below, transmission 316 includes an electric machine such as an electric motor/generator (M/G) 318, an associated traction battery 320, a torque converter 322, and a multiple step-ratio automatic transmission, or gearbox 324. The engine 314, M/G 318, torque converter 322, and the automatic transmission 316 are connected sequentially in series, as illustrated in FIG. 3.

The engine 314 and the M/G 318 are both drive sources for the HEV 310. The engine 314 generally represents a power source that may include an internal combustion engine such as a gasoline, diesel, or natural gas-powered engine, or a fuel cell. The engine 314 generates an engine power and corresponding engine torque that is supplied to the M/G 318 when a disconnect clutch 326 between the engine 314 and the M/G 318 is at least partially engaged. The M/G 318 may be implemented by any one of a plurality of types of electric machines. For example, M/G 318 may be a permanent magnet synchronous motor. Power electronics condition direct current (DC) power provided by the battery 320 to the requirements of the M/G 318, as will be described below. For example, power electronics may provide three-phase alternating current (AC) to the M/G 318.

When the disconnect clutch 326 is at least partially engaged, power flow from the engine 314 to the M/G 318 or from the M/G 318 to the engine 314 is possible. For example, the disconnect clutch 326 may be engaged and M/G 318 may operate as a generator to convert rotational energy provided by a crankshaft 28 and M/G shaft 330 into electrical energy to be stored in the battery 320. The disconnect clutch 326 can also be disengaged to isolate the engine 314 from the remainder of the powertrain 312 such that the M/G 318 can act as the sole drive source for the HEV 310. Shaft 330 extends through the M/G 318. The M/G 318 is continuously drivably connected to the shaft 330, whereas the engine 314 is drivably connected to the shaft 330 only when the disconnect clutch 326 is at least partially engaged.

A separate starter motor 331 can be selectively engaged with the engine 314 to rotate the engine to allow combustion to begin. Once the engine is started, the starter motor 331 can be disengaged from the engine via, for example, a clutch (not shown) between the starter motor 331 and the engine 314. In one embodiment, the engine 314 is started by the starter motor 331 while the disconnect clutch 326 is open, keeping the engine disconnected with the M/G 318. Once the engine has started and is brought up to speed with the M/G 318, the disconnect clutch 326 can couple the engine to the M/G to allow the engine to provide drive torque.

In another embodiment, the starter motor 331 is not provided and, instead, the engine 314 is started by the M/G 318. To do so, the disconnect clutch 326 partially engages to transfer torque from the M/G 318 to the engine 314. The M/G 318 may be required to ramp up in torque to fulfill driver demands while also starting the engine 314. The disconnect clutch 326 can then be fully engaged once the engine speed is brought up to the speed of the M/G.

The M/G 318 is connected to the torque converter 322 via shaft 330. The torque converter 322 is therefore connected to the engine 314 when the disconnect clutch 326 is at least partially engaged. The torque converter 322 includes an impeller fixed to M/G shaft 330 and a turbine fixed to a transmission input shaft 32. The torque converter 322 thus provides a hydraulic coupling between shaft 330 and transmission input shaft 32. The torque converter 322 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 334 may also be provided that, when engaged, frictionally or mechanically couples the impeller and the turbine of the torque converter 322, permitting more efficient power transfer. The torque converter bypass clutch 334 may be operated as a launch clutch to provide smooth vehicle launch. Alternatively, or in combination, a launch clutch similar to disconnect clutch 326 may be provided between the M/G 318 and gearbox 324 for applications that do not include a torque converter 322 or a torque converter bypass clutch 334. In some applications, disconnect clutch 326 is generally referred to as an upstream clutch and launch clutch 334 (which may be a torque converter bypass clutch) is generally referred to as a downstream clutch.

The gearbox 324 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 336 and the transmission input shaft 332. The gearbox 324 is automatically shifted from one ratio to another based on various vehicle and ambient operating conditions by an associated controller, such as a powertrain control unit (PCU). The gearbox 324 then provides powertrain output torque to output shaft 336.

The hydraulically controlled gearbox 324 used with a torque converter 322 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 324 may be implemented by an automated mechanical (or manual) transmission (AMT) that includes one or more servo motors to translate/rotate shift forks along a shift rail to select a desired gear ratio. For example, an AMT may be used in applications with higher torque requirements, for example.

As shown in FIG. 1, the output shaft 336 is connected to a differential 340. The differential 340 drives a pair of wheels 342 via respective axles 344 connected to the differential 340. The differential transmits approximately equal torque to each wheel 342 while permitting slight speed differences such as when the vehicle turns a corner. Different types of differentials or similar devices may be used to distribute torque from the powertrain to one or more wheels. For example, in some applications, torque distribution may vary depending on the particular operating mode or condition.

The powertrain 312 further includes an associated controller 350 such as a powertrain control unit (PCU). While illustrated as one controller, the controller 350 may be part of a larger control system and may be controlled by various other controllers throughout the vehicle 310, such as a vehicle system controller (VSC). Separate additional controllers and their hierarchy will be described in more detail in FIG. 2. It should therefore be understood that the powertrain control unit 350 and one or more other controllers can collectively be referred to as a "controller" that controls various actuators in response to signals from various sensors to control functions such as starting/stopping, operating M/G 318 to provide wheel torque or charge battery 320, select or schedule transmission shifts, etc. Controller 350 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 350 may communicate signals to and/or from engine 314, disconnect clutch 326, M/G 318, launch clutch 334, transmission gearbox 324, and power electronics 356. Although not explicitly illustrated, often various functions or components may be controlled by controller 350 within each of the subsystems identified above. Examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 326, launch clutch 334, and transmission gearbox 324, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 334 status (TCC), deceleration or shift mode (MDE).

Control logic or functions performed by controller 350 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, often one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 350. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 352 is used by the driver of the vehicle to provide a demanded torque, power, or drive command to propel the vehicle. In general, depressing and releasing the pedal 352 generates an accelerator pedal position signal that may be interpreted by the controller 350 as a demand for increased power or decreased power, respectively. Based at least upon input from the pedal, the controller 350 commands torque from the engine 314 and/or the M/G 318. The controller 350 also controls the timing of gear shifts within the gearbox 324, as well as engagement or disengagement of the disconnect clutch 326 and the torque converter bypass clutch 334. Like the disconnect clutch 326, the torque converter bypass clutch 334 can be modulated across a range between the engaged and disengaged positions. This produces a variable slip in the torque converter 322 in addition to the variable slip produced by the hydrodynamic coupling between the impeller and the turbine. Alternatively, the torque converter bypass clutch 334 may be operated as locked or open without using a modulated operating mode depending on the particular application.

To drive the vehicle with the engine 314, the disconnect clutch 326 is at least partially engaged to transfer at least a portion of the engine torque through the disconnect clutch 326 to the M/G 318, and then from the M/G 318 through the torque converter 322 and gearbox 324. When the engine 314 alone provides the torque necessary to propel the vehicle, this operation mode may be referred to as the "engine mode," "engine-only mode," or "mechanical mode."

The M/G 318 may assist the engine 314 by providing additional power to turn the shaft 330. This operation mode may be referred to as a "hybrid mode," an "engine-motor mode," or an "electric-assist mode."

To drive the vehicle with the M/G 318 as the sole power source, the power flow remains the same except the disconnect clutch 326 isolates the engine 314 from the remainder of the powertrain 312. Combustion in the engine 314 may be disabled or otherwise OFF during this time to conserve fuel. The traction battery 320 transmits stored electrical energy through wiring 354 to power electronics 356 that may include an inverter, for example. The power electronics 356 convert DC voltage from the battery 320 into AC voltage to be used by the M/G 318. The controller 350 commands the power electronics 356 to convert voltage from the battery 320 to an AC voltage provided to the M/G 318 to provide positive or negative torque to the shaft 330. This operation mode may be referred to as an "electric only mode," "EV (electric vehicle) mode," or "motor mode."

In any mode of operation, the M/G 318 may act as a motor and provide a driving force for the powertrain 312. Alternatively, the M/G 318 may act as a generator and convert kinetic energy from the powertrain 312 into electric energy to be stored in the battery 320. The M/G 318 may act as a generator while the engine 314 is providing propulsion power for the vehicle 310, for example. The M/G 318 may additionally act as a generator during times of regenerative braking in which rotational energy from spinning wheels 342 is transferred back through the gearbox 324 and is converted into electrical energy for storage in the battery 320.

It should be understood that the schematic illustrated in FIG. 3 is merely exemplary and is not intended to be limited. Other configurations are contemplated that utilize selective engagement of both an engine and a motor to transmit through the transmission. For example, the M/G 318 may be offset from the crankshaft 328, and/or the M/G 318 may be provided between the torque converter 322 and the gearbox 324. Other configurations are contemplated without deviating from the scope of the present disclosure.

In one exemplary system when during normal operation, driver requests are interpreted by the Vehicle System Control (VSC). These requests include a gear selection (PRNDL) and an accelerator pedal position (APPS) to interpret a desired wheel torque. Other driver requests include a brake pedal position input to a brake pedal position sensor (BPPS) that is interpreted by the Brake System Control Module (BSCM) and a wheel torque modification request that is sent to the VSC to adjust the final wheel torque. The high-voltage battery electronic control module (BECM) monitors battery characteristics including, at a battery cell level and overall battery level, a battery temperature, terminal voltage, current, and state of charge (SOC), and based on the battery characteristics determines a maximum allowable discharge power limit and a maximum allowable charge power limit. The VSC then determines a powertrain operating point to maintain the battery state of charge while minimizing fuel consumption and delivering the driver requested vehicle operation. A Torque Control (TC) controller in the VSC determines torque split such that a torque demand is divided between engine torque and motor torque commands.

The VSC and Motor Control Unit (MCU) communicate via a communication bus 210 (e.g., CAN bus, Flexray bus, Ethernet bus, or other vehicle bus) (See FIG. 2). During normal operation, the VSC sends a motor torque commend with a desired motor torque to MCU and MCU responds back with a driven motor torque. During a communication fault in which the MCU losing communication with the VSC, the VSC does not transmit the motor torque commend and does not receive the driven torque from the MCU.

Figure 4:
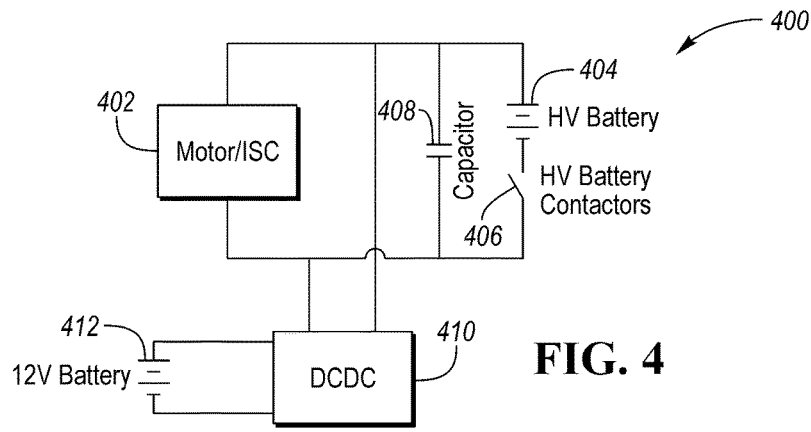
FIG. 4 is a schematic diagram of the electric power connections in a HEV power system.

FIG. 4 is a schematic diagram of the electric power connections in a HEV power system 400. The HEV power system includes a motor/inverter system controller (ISC)

402 that is powered by a traction (e.g., high-voltage) battery 404. The battery 404 may be disconnected from the circuit via high-voltage (HV) contactors 406 and a capacitor 408 is typically coupled parallel with motor/ISC 402. Also, a Direct Current (DC) to DC converter 410 is selectively coupled in parallel with the battery 404 to convert a high-voltage (e.g., >100 Volts, 240V, or 300V) of the traction battery 404 to a low-voltage (e.g., <100 Volts, 24V, or 12V) of the auxiliary battery 412.

In an MHT configuration, the 12V system 412 is charged via the DC/DC converter 410 and the high-voltage bus (e.g., the traction battery 404). The high-voltage battery 404, in turn, is charged via the high-voltage electric motor 402, or in a PHEV implementation via a connection with a power grid (not shown).

Often systems are configured such that when communication is lost between an MCU and VSC, the MCU will not operate the electric motor charge the traction battery 404 that in turn would limit charging of the auxiliary (e.g., 12V) battery 412 via the remaining energy of the traction battery 404. As such, the traction battery 404 may eventually become depleted due to use of high-voltage loads (e.g., air-conditioning load, DC/DC). Eventually, the auxiliary (e.g., 12V) battery 412 may also become depleted resulting in a 12V bus voltage falling below a certain threshold to keep the Engine Control Unit (ECU) alive. This will result in a shutdown of the vehicle (e.g., quit on road (QoR).

Here, a strategy is provided to continue to operate a vehicle (e.g., vehicle 310 or vehicle 112) when a controller (such as an MCU) loses communication (e.g., CAN, Ethernet, or Flexray communication). In one illustration, an MCU loses CAN communication with all modules including a Battery Control Module (BECM). Loss of BECM communication is a more restrictive failure and hence, is a superset of other possible scenarios for example, an MCU partial CAN communication loss.

Here, the MCU operates the motor independently (i.e., without a torque command received from a vehicle system controller (VSC)). In a lost communication scenario, the MCU enters into an inverter voltage maintenance mode (i.e., a desired motor torque is based on a feedback controller to maintain an inverter voltage at a desired set point. The VSC uses traction battery current and traction battery voltage to estimate a motor torque in an absence of actual feedback from MCU monitoring the motor. The VSC then corrects the requested engine torque based on the estimated motor torque. This ensures engine produces enough torque to meet driver demand as well as to compensate for the electric motor load.

Figure 5:
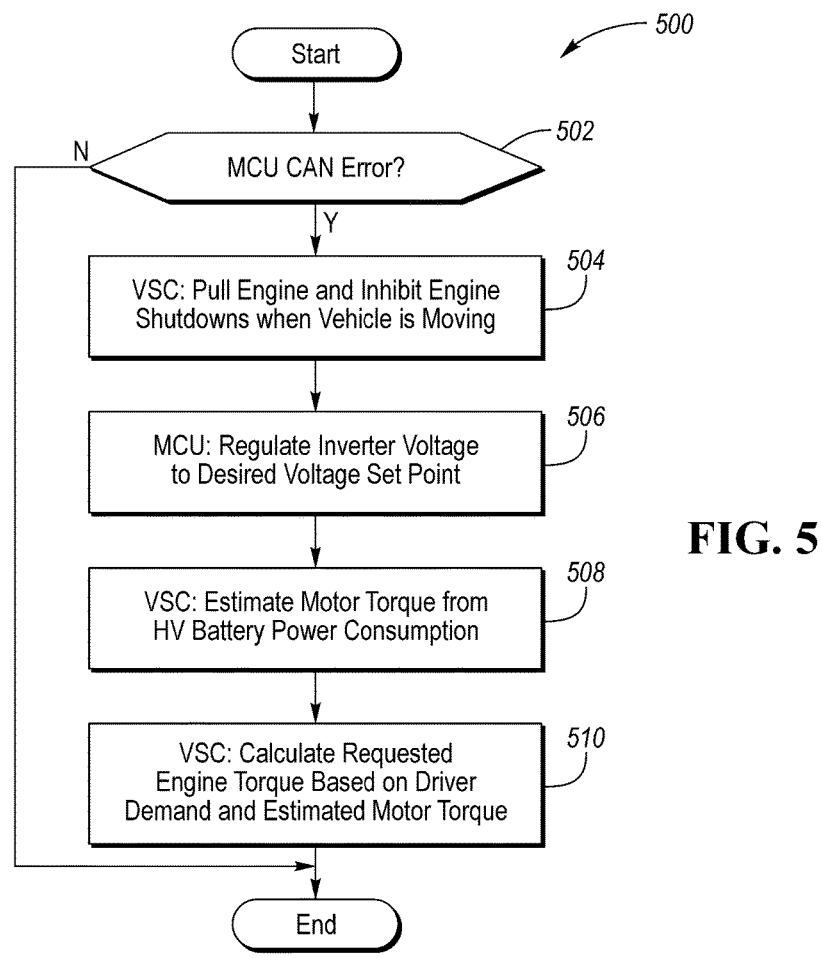
FIG. 5 is a flow diagram of a vehicle control system during a loss of motor communications.

FIG. 5 is a flow diagram of a vehicle control system during a loss of motor communications. In this example flow diagram, an MHT hybrid powertrain is configured to propel the vehicle solely by engine, and a power-split hybrid requires controlling engine speed to a set target via generator and wheel torque is function of engine and motor torque. Here, an FMEM strategy to operate a vehicle in the event of MCU losing CAN communication is disclosed. A controller branches on detection of a communication failure in block 502. If the no communication failure is detected, the controller exits. In the event of MCU communication failure (e.g., CAN communication failure that may result in a flag being set in all associated modules), in block 504 the controller in the VSC pulls-up (e.g., starts) the engine (if the engine was not operating) and inhibits engine stop-start during operation and proceeds to block 506. Stop-start operation allows a controller to shut off the internal combustion engine (ICE) when a demand drops below a threshold (e.g., when the vehicle is at stop light, stopped in traffic, or even coasting down an incline) and automatically starts the ICE when a demand exceeds the threshold (e.g., when the gas pedal is depressed to accelerate the vehicle). By stopping the ICE when the demand is below the threshold, fuel efficiency is increased. The communication failure may be detected via multiple ways, for example, some communication strategies an acknowledgement is automatically sent from the receiving module upon reception of a packet of data. Also, some of the modules communicate with other modules on a regular or semi-regular basis as such a up/down timer may be configured generate an interrupt upon an overflow/underflow and to reset upon reception of an acknowledgement or other communication message. The reset of the up/down counter may be include loading a predetermined value and counting down or up until an underflow/overflow occurs, or alternatively the counter may load zeroes or 1 s (e.g., 0xFFFF) upon reset, and count up/down until the timer matches the predetermined value loaded into a match register.

Once the communication failure is detected, the MCU controller in block 506 enters into an inverter voltage maintenance mode in which the inverter output voltage is maintained at a current voltage level. In block 508 the VSC controller estimates a desired motor torque based on a feedback controller in which the inverter voltage is maintained at a desired set point. Here, the set point is stored inside MCU and doesn't need any communication from VSC.

$$e = V_{set} - V_{inv} \tag{1}$$

$$\tau_{mtr}^{des} = f(e) \tag{2}$$

In which $V_{set}$ is the desired inverter voltage set point, $V_{inv}$ is the inverter voltage and $\tau_{mtr}^{des}$ is the desired motor torque. The function $f$ is a feedback controller to calculate desired motor torque as function of voltage error. One of the implementation of this feedback controller is a PID controller that may be represented by equation 3 below.

$$f = K_P \cdot e + K_I \int e \cdot dt + K_D \cdot \dot{e} \tag{3}$$

In which $K_P$, $K_I$ and $K_D$ are the PID gains for the feedback controller.

Generally, a loss in communication with the BECM results in a loss of traction battery State of Charge (SOC) information being provided to the MCU. As the traction battery SOC is highly correlated with a voltage of the traction battery when the battery chemistry is Li-Ion, maintaining a set voltage is very similar to maintaining a desired SOC in the traction battery. The closed loop control is performed on the inverter voltage (i.e. terminal voltage at the motor) which is available to the MCU based on a voltage sensor without battery voltage over the communication link from the BECM.

Also, the desired motor torque may be clipped on the positive side to a calibratable based on nominal engine friction torque. Without this clip, it is possible to create an unintended acceleration for extremely low driver demands as engine will not be able to reduce torque below its friction torque. The VSC estimates the motor torque $\tau_{mtr}^{est}$ based on battery current and voltage as shown in the equation below $$P_{Bat} = V_{Bat} * I_{BAT} \tag{4}$$

$$\tau_{mtr}^{est} = \frac{P_{Bat}}{\omega_{eng}} \quad (5)$$

In which, $V_{Bat}$ is the HV battery voltage, $I_{Bat}$ is the HV battery current and $\omega_{eng}$ is the engine speed. The engine speed may be used as a substitute for motor speed in equation 5 as motor speed is not available due to communication failure with MCU. After the controller proceeds to block 510 in which the requested engine torque $\tau_{eng}^{req}$ may be then corrected for the estimated motor torque as shown in equation 6.

$$\tau_{eng}^{req} = \tau_{DD} + \tau_{mtr}^{est} \quad (6)$$

In which, $\tau_{DD}$ is the driver demand.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a motor;
   an inverter; and
   a motor controller configured to, responsive to an absence of receiving communication packets for a predetermined time during a drive cycle, operate the inverter to output voltage at a setpoint defined by a terminal voltage of the inverter at expiration of the predetermined time, the motor configured to apply torque according to a change in the voltage.

2. The vehicle of claim 1 further comprising a traction battery, wherein the terminal voltage is measured across terminals coupling the inverter to the traction battery responsive to the motor providing a propulsive force.

3. The vehicle of claim 2 further comprising an auxiliary battery and a DC converter configured to equalize voltage between the traction battery and an auxiliary battery.

4. The vehicle of claim 1 further comprising an engine, a traction battery, and an engine controller configured to, responsive to absence of receiving communication packets from the motor controller for the predetermined time, operate the engine based on a current of the traction battery.

5. The vehicle of claim 4, wherein the engine controller is further configured to, responsive to the absence of receiving communication packets from the motor controller for the predetermined time, inhibit automatic stop-start operation of the engine.

6. The vehicle of claim 4, wherein the engine controller is further configured to, responsive to the absence of receiving communication packets from the motor controller for the predetermined time while the engine is not operating, start the engine.

7. The vehicle of claim 1, wherein the motor is further configured to apply the torque according to an estimated traction battery state of charge.

8. A hybrid vehicle, comprising:
   a motor;
   an engine;
   a traction battery; and an engine controller configured to, responsive to an absence of receiving communication packets from a motor controller for a predetermined time during a drive cycle, operate the engine according to a current of the traction battery.

9. The hybrid vehicle of claim 8 further comprising an inverter and a motor controller configured to operate the inverter to output voltage at a setpoint defined by a terminal voltage of the inverter at expiration of the predetermined time, the motor configured to apply torque according to a change in the terminal voltage.

10. The hybrid vehicle of claim 9, wherein the terminal voltage is measured across terminals coupling the inverter and traction battery responsive to the motor providing a propulsive force.

11. The hybrid vehicle of claim 8, wherein the engine controller is further configured to, responsive to the absence, inhibit stop-start operation of the engine.

12. The hybrid vehicle of claim 8, wherein the engine controller is further configured to, responsive to the absence while the engine is not operating, start the engine.

13. A computer-implemented method comprising:
responsive to absence of a motor controller receiving communication packets for a predetermined time during a drive cycle, operating by the controller
an inverter to output voltage at a setpoint defined by an inverter terminal voltage at expiration of the predetermined time, and
a motor coupled with the inverter to apply torque according to a change in the voltage.

14. The method of claim 13 further comprising, responsive to an absence of an engine controller receiving communication packets from the motor controller for the predetermined time, operating an engine according to a current of a traction battery.

15. The method of claim 14 further comprising responsive to the absence of the engine controller receiving communication packets from the motor controller for the predetermined time while the engine is not operating, starting the engine.

16. The method of claim 15 further comprising responsive to the absence of the engine controller receiving communication packets from the motor controller for the predetermined time, inhibiting engine stop-start operation.

* * * * *